US012362481B2

(12) United States Patent
Li et al.

(10) Patent No.: US 12,362,481 B2
(45) Date of Patent: Jul. 15, 2025

(54) TUNABLE ANTENNA, METHOD FOR PREPARING THE SAME, AND ELECTRONIC DEVICE USING THE SAME

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Chunxin Li, Beijing (CN); Jingwen Guo, Beijing (CN); Qianhong Wu, Beijing (CN); Zibo Cao, Beijing (CN); Feng Qu, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/021,423

(22) PCT Filed: Jun. 29, 2022

(86) PCT No.: PCT/CN2022/102481
§ 371 (c)(1),
(2) Date: Feb. 15, 2023

(87) PCT Pub. No.: WO2024/000306
PCT Pub. Date: Jan. 4, 2024

(65) Prior Publication Data
US 2024/0266732 A1 Aug. 8, 2024

(51) Int. Cl.
*H01Q 5/364* (2015.01)
*H01Q 1/24* (2006.01)
(Continued)

(52) U.S. Cl.
CPC ............. *H01Q 5/364* (2015.01); *H01Q 1/243* (2013.01); *H01Q 9/14* (2013.01); *H01Q 9/42* (2013.01);
(Continued)

(58) Field of Classification Search
CPC .......... H01Q 5/30; H01Q 5/357; H01Q 5/364; H01Q 5/40; H01Q 5/50; H01Q 9/14;
(Continued)

(56) References Cited

U.S. PATENT DOCUMENTS 4,751,513 A 6/1988 Daryoush et al.
6,204,819 B1 * 3/2001 Hayes ...................... H01Q 1/38 343/702
(Continued)

FOREIGN PATENT DOCUMENTS

CN 106299630 A 1/2017
CN 114188707 A 3/2022
JP 2007-142721 A 6/2007

*Primary Examiner* — Jason M Crawford
(74) *Attorney, Agent, or Firm* — WHDA, LLP

(57) ABSTRACT

The disclosure provides a tunable antenna, a method for preparing the tunable antenna and an electronic device, wherein the tunable antenna includes a substrate, and a microstrip feeder and a plurality of antennas arranged at intervals on a side of the substrate, wherein the microstrip feeder is configured to provide a coupling signal; and a control switch, arranged between the microstrip feeder and the plurality of antennas, and/or between at least two adjacent antennas the plurality of antennas, wherein the control switch is configured to control conduction between the microstrip feeder and at least one of the plurality of antennas, so as to output the coupling signal provided by the microstrip feeder into electromagnetic waves of different frequency bands.

7 Claims, 13 Drawing Sheets

(51) Int. Cl.
*H01Q 9/14* (2006.01)
*H01Q 9/42* (2006.01)
*H01Q 21/00* (2006.01)
*H01Q 23/00* (2006.01)

(52) U.S. Cl.
CPC ......... *H01Q 21/0075* (2013.01); *H01Q 23/00* (2013.01)

(58) Field of Classification Search
CPC ........... H01Q 21/0006; H01Q 21/0075; H01Q 23/00; H01Q 3/24; H01Q 15/002; H01Q 15/0066
See application file for complete search history.

(56) References Cited

U.S. PATENT DOCUMENTS

| | | | | |
|---|---|---|---|---|
| 6,417,807 | B1 * | 7/2002 | Hsu | H01Q 9/285 343/781 CA |
| 6,674,340 | B2 * | 1/2004 | Quan | H01P 5/10 333/164 |
| 6,714,169 | B1 * | 3/2004 | Chau | H01Q 23/00 333/262 |
| 6,888,505 | B2 * | 5/2005 | Tran | H01Q 3/247 343/702 |
| 7,132,992 | B2 * | 11/2006 | Mori | H01Q 19/30 343/770 |
| 7,151,501 | B2 * | 12/2006 | Tran | H01Q 5/371 343/823 |
| 7,414,500 | B2 * | 8/2008 | De Los Santos | H01H 59/0009 335/78 |
| 8,018,308 | B2 * | 9/2011 | Kwon | H01P 1/127 335/78 |
| 9,118,107 | B2 * | 8/2015 | Rofougaran | H01Q 21/064 |
| 9,716,304 | B2 * | 7/2017 | White | H01P 5/19 |
| 2003/0193377 | A1 * | 10/2003 | Quan | H01P 5/10 333/164 |
| 2004/0164905 | A1 | 8/2004 | Tran | |
| 2004/0164922 | A1 * | 8/2004 | Tran | H01Q 9/28 343/757 |
| 2004/0227678 | A1 * | 11/2004 | Sievenpiper | H01Q 1/243 343/702 |
| 2005/0178646 | A1 * | 8/2005 | De Los Santos | H01H 59/0009 200/181 |
| 2006/0079177 | A1 * | 4/2006 | Okubora | H01Q 9/145 455/25 |
| 2006/0222101 | A1 * | 10/2006 | Cetiner | H04B 7/04 375/267 |
| 2006/0284774 | A1 * | 12/2006 | Salsman | H01Q 1/247 343/703 |
| 2009/0121951 | A1 * | 5/2009 | Kaneda | H01Q 9/285 334/45 |
| 2009/0207091 | A1 * | 8/2009 | Anagnostou | H01Q 9/285 343/876 |
| 2010/0289717 | A1 * | 11/2010 | Arslan | H01Q 23/00 343/876 |
| 2022/0004077 | A1 * | 1/2022 | Gong | G02B 6/34 |
| 2024/0222870 | A1 * | 7/2024 | Li | H01Q 21/00 |
| 2024/0266732 | A1 * | 8/2024 | Li | H01Q 9/14 |
| 2024/0275051 | A1 * | 8/2024 | Li | H01Q 9/0407 |

* cited by examiner

TUNABLE ANTENNA, METHOD FOR PREPARING THE SAME, AND ELECTRONIC DEVICE USING THE SAME

CROSS-REFERENCE TO RELATED APPLICATION

The present disclosure is a National Stage of International Application No. PCT/CN2022/102481, filed on Jun. 29, 2022, with the title of "TUNABLE ANTENNA, METHOD FOR PREPARING THE SAME, AND ELECTRONIC DEVICE", which is incorporated herein in its entirety by reference.

FIELD

The present disclosure relates to the field of antenna technology, in particular to a tunable antenna, a method for preparing the tunable antenna and an electronic device using the tunable antenna.

BACKGROUND

With rapid development of the information age, wireless terminals with high integration, miniaturization, multi-function and low cost have gradually become a development trend of communication technology. As an important part of wireless communication, performance of antenna directly affects quality of information communication. In order to meet development needs of science and technology and industry, antennas are developing towards ultra-wideband, functional diversification, miniaturization and intelligence.

Among them, frequency-reconfigurable antennas come into being. Frequency reconfiguration means that a relationship among elements in a multi-antenna array may be flexibly changed according to an actual situation, rather than fixed. It realizes a variable output frequency of the antenna mainly by adjusting a state-variable device. In related technology, the frequency-reconfigurable antenna generally adopts liquid crystal to realize the frequency reconfiguration, but a realization of frequency reconfiguration using the liquid crystal depends on a deflection of liquid crystal molecules under an action of appropriate electric field, which has a problem of long response time.

SUMMARY

In a first aspect, an embodiments of the present disclosure provides a tunable antenna, including:

- a substrate, and a microstrip feeder and a plurality of antennas arranged at intervals on a side of the substrate, wherein the microstrip feeder is configured to provide a coupling signal; and
- a control switch, arranged between the microstrip feeder and the plurality of antennas, and/or between at least two adjacent antennas the plurality of antennas,
- wherein the control switch is configured to control conduction between the microstrip feeder and at least one of the plurality of antennas, so as to output the coupling signal provided by the microstrip feeder into electromagnetic waves of different frequency bands.

In an optional embodiment of the disclosure, the control switch includes a MEMS switch, and the MEMS switch includes at least a cantilever beam and a drive electrode arranged corresponding to the cantilever beam, wherein the drive electrode is configured to apply a driving voltage; and

- the cantilever beam includes a fixed end and a movable end, and the movable end is configured to contact with or separate from the antenna under an action of the driving voltage.

In an optional embodiment of the disclosure, the control switch includes at least one first MEMS switch and at least one second MEMS switch, wherein the first MEMS switch includes two of the cantilever beams, and the second MEMS switch includes one of the cantilever beam.

In an optional embodiment of the disclosure, the second MEMS switch is set between the microstrip feeder and one of the plurality of antennas, and the first MEMS switch is set among three adjacent antennas the plurality of antennas, wherein

- both fixed ends of the two cantilever beams of the first MEMS switch are connected with an output end of a same antenna, and movable ends of the two cantilever beams are respectively suspended above different antennas the plurality of antennas; and
- a fixed end of the cantilever beam of the second MEMS switch is connected with the microstrip feeder, and a movable end of the cantilever beam is suspended above one of the plurality of antennas.

In an optional embodiment of the disclosure, the first MEMS switch is set between the microstrip feeder and two antennas in the plurality of antennas, and the second MEMS switch is set between two adjacent antennas the plurality of antennas, wherein

- both fixed ends of the two cantilever beams of the first MEMS switch are connected with an output end of the microstrip feeder, and movable ends of the two cantilever beams are suspended above different antennas the plurality of antennas; and
- a fixed end of the cantilever beam of the second MEMS switch is connected with one of the two adjacent antennas, and a movable end is suspended above another one of the two adjacent antennas.

In an optional embodiment of the disclosure, the plurality of antennas includes a first antenna, a second antenna and a third antenna, the movable ends of the two cantilever beams of the first MEMS switch are respectively suspended above one end of the first antenna and one end of the second antenna; and the fixed end of the cantilever beam of the second MEMS switch is connected with another end of the second antenna, and the movable end of the cantilever beam of the second MEMS switch is suspended above one end of the third antenna, wherein

- in response to that the first MEMS switch conducts the microstrip feeder and the first antenna, the microstrip feeder provides the coupling signal to the first antenna, to output the electromagnetic wave of a first frequency band;
- in response to that the first MEMS switch conducts the microstrip feeder and the second antenna, the microstrip feeder provides the coupling signal to the second antenna, to output the electromagnetic wave of a second frequency band; and
- in response to that the first MEMS switch conducts the microstrip feeder and the second antenna, and the second MEMS switch conducts the second antenna and the third antenna, the microstrip feeder provides the coupling signal to the second antenna and the third antenna, to output the electromagnetic wave of a third frequency band or a fourth frequency band.

In an optional embodiment of the disclosure, the first frequency band is 2.496 GHZ-2.690 GHz, the second frequency band is 4.4 GHZ-5 GHZ, the third frequency band is 3.3 GHZ-3.8 GHZ, and the fourth frequency band is 3.3 GHZ-4.2 GHZ.

In an optional embodiment of the disclosure, a size of the movable end of the cantilever beam of the MEMS switch in a predetermined direction is larger than a first target size and smaller than a second target size, the predetermined direction is a direction perpendicular to a length direction of the antenna, the first target size is greater than or equal to 50 μm, and the second target size is less than or equal to a size of a width of the antenna.

In an optional embodiment of the disclosure, the size of the movable end of the cantilever beam of the MEMS switch in the predetermined direction is 50 μm to 150 μm.

In an optional embodiment of the disclosure, a convex contact point is arranged on a side of the antenna away from the substrate, and an orthographic projection of the contact point on the substrate overlaps with an orthographic projection of the movable end on the substrate.

In an optional embodiment of the disclosure, an insulating boss is arranged on a side of the substrate, the antenna covers the insulating boss, and an orthographic projection of the insulating boss on the substrate is an overlapping area of an orthographic projection of the movable end of the cantilever beam on the substrate and an orthographic projection of the antenna on the substrate.

In an optional embodiment of the disclosure, an orthographic projection of the movable end of the cantilever beam on the substrate covers an orthographic projection of the driving electrode on the substrate, and the orthographic projection of the driving electrode on the substrate does not overlap an orthographic projection of the antenna on the substrate.

In a second aspect, an embodiment of the disclosure further provides a method for preparing a tunable antenna, for preparing the above tunable antenna, and the method includes: providing a substrate:

- forming a microstrip feeder and a plurality of antennas arranged at intervals on a side of the substrate, and at least one control switch, to obtain the tunable antenna, wherein the microstrip feeder is configured to provide a coupling signal,
- wherein the at least one control switch is arranged between the microstrip feeder and the plurality of antennas, and/or between two adjacent antennas the plurality of antennas, and
- the control switch is configured to control conduction between the microstrip feeder and one or more of the plurality of antennas, so as to output the coupling signal provided by the microstrip feeder into electromagnetic waves of different frequency bands.

In an optional embodiment of the disclosure, the plurality of antennas includes a first antenna and a second antenna, the control switch includes a cantilever beam and driving electrodes arranged corresponding to the cantilever beam, and the forming the microstrip feeder and the plurality of antennas arranged at intervals on the side of the substrate and the at least one control switch, includes:

- adopting a composition process, to form the microstrip feeder, the plurality of antennas and the driving electrode on the side of the substrate;
- forming an insulating layer on a side of the driving electrode away from the substrate, wherein an orthographic projection of the insulating layer on the substrate covers an orthographic projection of the driving electrode on the substrate, and the orthographic projection of the insulating layer on the substrate does not overlap with an orthographic projection of the antenna on the substrate;
- patterning on a side of the insulating layer away from the substrate to form a sacrificial layer, wherein an orthographic projection of the sacrificial layer on the substrate covers at least an orthographic projection of the first antenna on the substrate, and the orthographic projection of the sacrificial layer on the substrate does not overlap with an orthographic projection of the second antenna on the substrate;
- forming the cantilever beam on a side of the sacrificial layer away from the substrate, wherein one end of the cantilever beam contacts with the second antenna, and an orthographic projection of another end of the cantilever beam on the substrate overlaps with the orthographic projection of the first antenna and the orthographic projection of the driving electrode on the substrate respectively; and
- releasing the sacrificial layer, to make the another end of the cantilever beam suspended above the first antenna as a movable end of the cantilever beam.

In an optional embodiment of the disclosure, before the adopting the composition process to form the microstrip feeder, the plurality of antennas and the driving electrode on the side of the substrate, the method further includes:

- forming an insulating boss on the side of the substrate, and
- the adopting the composition process to form the microstrip feeder, the plurality of antennas and the driving electrode on the side of the substrate, includes:
- adopting the composition process, to form the microstrip feeder, the plurality of antennas and the driving electrode on the side of the substrate where the insulating boss has been formed,
- wherein the antenna covers the insulating boss, and an orthographic projection of the insulating boss on the substrate is an overlapping area of an orthographic projection of the movable end of the cantilever beam on the substrate and the orthographic projection of the antenna on the substrate.

In a third aspect, an embodiment of the disclosure further provides an electronic device using the above tunable antenna.

The above description is only an overview of the technical solutions of the application. In order to better understand the technical means of the application, so as to implement the technical means according to the contents of the specification, and in order to make the above and other purposes, features and advantages of the application more distinct and understandable, specific implementations of the application are listed below.

BRIEF DESCRIPTION OF THE DRAWINGS

In order to more clearly illustrate technical solutions in embodiments of the disclosure or in related technology, the followings will briefly introduce drawings needed to be used in illustrating the embodiments or the related technology. Apparently, the drawings in the following description are only some embodiments of the disclosure. For those ordinary skilled in the field, they may further obtain other drawings according to the provided drawings without paying creative labor. It should be noted that scales in the drawings are only for illustration and do not represent actual scales.

DETAILED DESCRIPTION OF THE EMBODIMENTS

In order to make purposes, technical solutions and advantages of the embodiments of the application clearer, the followings will describe the technical solutions in the embodiments of the application clearly and completely in combination with the drawings in the embodiments of the application. Apparently, the described embodiments are a part of the embodiments of the application, not all of the embodiments of the application. Based on the embodiments in the application, all other embodiments obtained by the ordinary skilled in the art without doing creative work belong to the scope of protection in the application.

In related technology, antennas have been developed towards ultra-wideband, functional diversification, miniaturization and intelligence. Especially in the field of 5G communication, wide bands of the 5G communication field have made communication channels greatly increased. In such conditions, with continuous expansion of the communication channels, it is necessary to design a frequency-reconfigurable antenna to realize that one electronic device may receive signals from a plurality of communication channels.

Generally speaking, a frequency-reconfigurable antenna needs to realize a plurality of antenna layout in a certain space to support frequency reconfiguration. Generally, it adopts increasing a number of antennas to meet a requirement for realizing frequency reconfiguration in a plurality of bands. However, too many antennas will lead to electromagnetic interference between elements, and will further make an antenna size large, which is not conducive to miniaturization. Therefore, liquid crystal antennas come into being, but response times of the liquid crystal reconfigurable antenna is longer.

In view of the above, the application proposes a tunable antenna, which adopts a control switch with short response time as a control device of frequency reconfiguration. Specifically, a microstrip feeder and a plurality of antennas are arranged at intervals on a side of a substrate, and the control switch with short response time is arranged between the microstrip feeder and the plurality of antennas, and/or between at least two adjacent antennas, so as to, by controlling the switch, to control the microstrip feeder to conduct with at least one of the plurality of antennas to realize frequency reconfiguration in a short time and reduce the response time of frequency reconfiguration.

Figure 1:
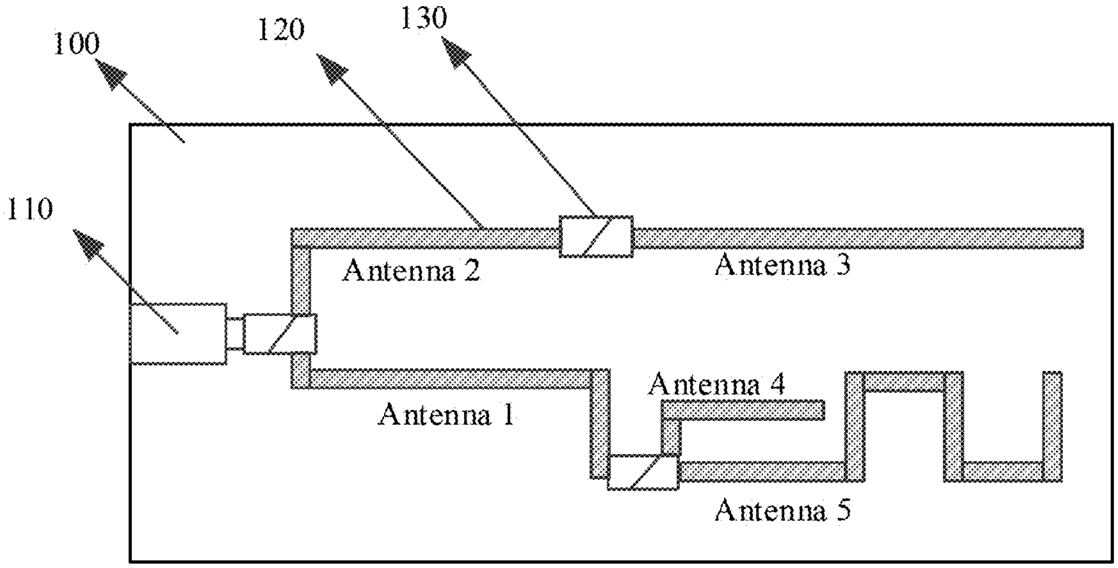
FIG. 1 is a schematic view illustratively showing a top-view structure of a front of a tunable antenna provided by an embodiment of the present disclosure.

Referring to that shown in FIG. 1, a schematic view of a tunable antenna is shown. As shown in FIG. 1, it is a schematic view showing a top-view of a front of the tunable antenna. FIG. 1 is a schematic view only illustratively showing a layout of five antennas. The tunable antenna of the application may specifically include:

- a substrate 100, and a microstrip feeder 110 and a plurality of antennas 120 arranged at intervals on a side of the substrate: wherein the microstrip feeder 110 is configured to provide a coupling signal; and
- a control switch 130 is arranged between the microstrip feeder 110 and the plurality of antennas 120, and/or between at least two adjacent antennas 120;
- wherein the control switch 130 is configured to control conduction between the microstrip feeder 110 and at least one of the plurality of antennas 120, so as to output the coupling signal provided by the microstrip feeder 110 into electromagnetic waves of different frequency bands.

In the embodiment, lengths of the plurality of antennas are different. Since a signal transmission frequency of one antenna is related to the length of the antenna, different antennas correspond to different frequency bands. Among them, on the side of the substrate 100, the microstrip feeder 110 is located at an edge of the side of the substrate, so as to make more space for deployment of the plurality of antennas 120 and control switches 130.

In an optional example, the tunable antenna may be reconfigured in a plurality of frequency bands. Specifically, by arranging the control switches 130 between the microstrip feeder 110 and the plurality of antennas 120, and/or between at least two adjacent antennas 120, it realizes transmission of the coupling signal provided by the microstrip feeder in transmission paths composed of different antennas, and output of electromagnetic waves of different frequency bands in different transmission paths, that is, through the control switches, a plurality of transmission paths for transmitting the coupling signal of the microstrip feeder may be formed. Different transmission paths are composed of different antennas. As shown in FIG. 1, the coupling signal of the microstrip feeder has five transmission paths, namely: the microstrip feeder-antenna 1, the microstrip feeder-antenna 2, the microstrip feeder-the antenna 2-antenna 3, the microstrip feeder-the antenna 1-antenna 4, and the microstrip feeder-the antenna 1-antenna 5.

Specifically, a number of the antennas may be determined according to an actual demand and an area of the side of the substrate. It may include at least three antennas, and then a number of control switches may be at least two according to the number of the antennas. In general, the number of control switches may be the number of antennas reduced by one, so as to realize the reconfiguration of electromagnetic waves in at least three frequency bands. Among them, the illustrative description in FIG. 1 for convenience of explaining various situations of the tunable antenna of the present application, does not represent a specific restriction on the tunable antenna of the present application. In other embodiments, the number of the antennas may be two as well. In such a condition, the number of the control switches may be one, which is used for conducting or not conducting a connection between the two antennas, so as to realize a reconfiguration for electromagnetic waves in the two frequency bands. When a plurality of antennas are deployed, electromagnetic interference among the antennas should be avoided, that is, spacings among the antennas should be based on an absence of electromagnetic interference.

Among them, the control switch 130 may be connected between the microstrip feeder 110 and the plurality of antennas 120, or the control switch 130 may be connected between at least two adjacent antennas 120. In a condition that the control switch 130 is connected between the microstrip feeder 110 and the plurality of antennas 120, the control switch may be connected with one antenna in the plurality of antennas 120, or respectively with two antennas in the plurality of antennas 120, as shown in FIG. 1, which is the case where the control switch is set between the microstrip feeder 110 and two antennas 120. Even in one example, the control switch may be connected to three or more antennas in the plurality of antennas 120, which depends on an actual antenna layout and a number of contacts of the control switch.

In a condition that the control switch 130 is connected between at least two adjacent antennas 120, the control switch may be respectively connected with two or three adjacent antennas in the plurality of antennas 120. In a condition that the two antennas are connected, the two antennas may be conducted or not conducted. If the two antennas are conducted to each other, the two antennas are connected in series, thus extending a transmission path of the microstrip feeder in the antenna and reducing frequency. As shown in FIG. 1, a case where the control switch is connected between two antennas (the antenna 2 and the antenna 3) is shown.

Among them, in a condition of connecting three adjacent antennas, the control switch may enable one of the three antennas to conduct with any of the other two antennas. As shown in FIG. 1, which shows the condition that the control switch is connected among three antennas (the antenna 1, the antenna 4 and the antenna 5). The control switch may conduct the antenna 4 and the antenna 1, as well as conduct the antenna 1 and the antenna 5.

Among them, the respective control switches may have corresponding separate control circuits to separately control states of the respective control switches. Alternatively, in some examples, a plurality of control switches may be controlled by the same control circuit as well. In such a condition, the control circuit may be a micro-integrated circuit. Different control switches are connected to different output ports of the micro-integrated circuit through the respective transmission lines thereof, so as to realize centralized control of a plurality of control switches.

In some embodiments, the control switch is a switching device, it responds based on a change of voltage, such as conducting the connected device at a given level, so a response speed thereof is faster than a response speed of liquid crystal, which may improve a response speed of the tunable antenna of the present application during frequency reconfiguring. Among them, for the control switch, a MEMS (Micro Electro Mechanical Systems) switch may be selected as the control switch.

By adopting the technical solution of the embodiment of the present application, the microstrip feeder may be controlled to conduct with at least one of the plurality of antennas through the control switch, so that the frequency reconfiguration may be realized in a short time and the response time of the frequency reconfiguration may be reduced.

The followings describe several optional structures of the tunable antennas of the present application.

As described in the above embodiments, the control switch includes the microelectromechanical system (MEMS) switch, wherein the MEMS switch has notable advantages in terms of insertion loss, power consumption, volume and cost, and is a micro device, which may be applied to a miniaturized tunable antenna, such as an antenna of a mobile phone.

Figure 2:
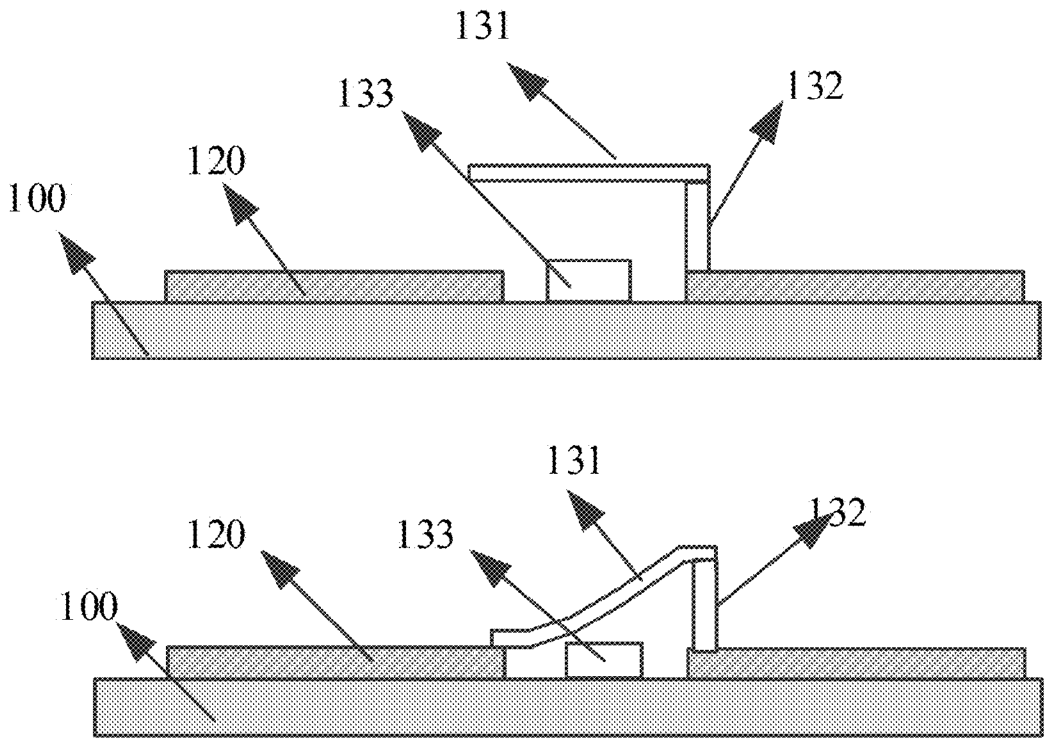
FIG. 2 is a schematic view illustratively showing a structural of a control switch provided by an embodiment of the present disclosure.

Among them, referring to that shown in FIG. 2, it is a schematic view showing a structural of a control switch, as shown in FIG. 2, including a MEMS switch. The MEMS switch may include at least one cantilever beam and a drive electrode 133 arranged corresponding to the cantilever beam. The drive electrode 133 is configured to apply a driving voltage. The cantilever beam includes a fixed end 132 and a movable end 131. The movable end 131 is configured to contact with or separate from the antenna 120 under an action of the driving voltage.

Among them, as shown in an upper figure of FIG. 2, it is a schematic view of not conducting between the movable end and the antenna, and a lower figure is a schematic view of contacting between the movable end and the antenna. As shown in the upper figure, the movable end 131 is suspended above the antenna 120 without being affected by the driving voltage. Among them, in order to make an end part of the movable end fully contact with the antenna, as shown in the lower figure at of FIG. 2, when the movable end contacts with the antenna, the end part of an end of the movable end, close to the antenna, may be bent downward to a certain shape, so as to make a bottom surface of the end part of the end of the movable end, close to the antenna, fully contacts with the antenna, thus ensuring transmission quality of the coupling signal.

Among them, the driving electrode corresponding to each cantilever beam is connected with a control module through a transmission line, and the control module is configured to provide a bias voltage to the driving electrode through the corresponding transmission line, so as to control the movable end of the cantilever beam to be conducted or not conducted with the antenna. In one embodiment, an insulating layer may be deposited on a side of the driving electrode away from the substrate.

Among them, in a condition that the control switch is connected between two adjacent antennas, the fixed end of the cantilever beam may be connected with the antenna, and the movable end may be suspended above the other antenna. In a condition that the control switch is connected between the microstrip feeder and the antenna, the fixed end of the cantilever beam may be connected with the microstrip feeder, and the movable end may be suspended above the antenna.

When adopting a MEMS switch, because the MEMS switch is integrated on a silicon chip by using micromachining technology, it has excellent performance in communication from radio frequency to millimeter wave (0.1 GHZ-1000 GHZ). Compared with traditional semiconductor devices such as bipolar transistors and metal oxide field effect transistors, the MEMS switch has advantages such as small signal distortion, signal separation from the driver, low power consumption, good linearity, small size and long life, etc. In this way, a size of the tunable antenna in the application is small, which may leave more layout space for a plurality of antennas.

In an optional example, according to an actual situation, the control switch in the tunable antenna may only include a MEMS switch of two cantilever beams, or only include the MEMS switch of one cantilever beam. As shown in FIG. 1, in a condition that only the MEMS switch of the two cantilever beams is included, the tunable antenna may be the one without the antenna 3, so as to make the coupling signal of the microstrip feeder has four transmission paths. In a condition that only the MEMS switch of the one cantilever beam is included, the tunable antenna may be the one without the antenna 1, the antenna 4 and the antenna 5, so as to make the coupling signal of the microstrip feeder has two transmission paths, namely, the microstrip feeder-the antenna 2, and the microstrip feeder-the antenna 2-the antenna 3 respectively. In such a condition, there may be no control switch between the microstrip feeder and the antenna 2.

In an optional example, the control switch in the tunable antenna may include the MEMS switch of the two cantilever beams and the MEMS switch of the one cantilever beam. Among them, a number of the MEMS switch of two cantilever beams may be at least one, and a number of the MEMS switch of the one cantilever beam may be at least one as well. As shown in FIG. 1, it is directly a condition that both the MEMS switch of the two cantilever beams and the MEMS switch of the one cantilever beam are included, and the number of the MEMS switch of the two cantilever beams may be two.

Among them, the MEMS switch of the two cantilever beams is a first MEMS switch, and the switch of the one cantilever beam is a second MEMS switch, that is, the first MEMS switch includes the two cantilever beams, and the second MEMS switch includes the one cantilever beam.

Figure 3:
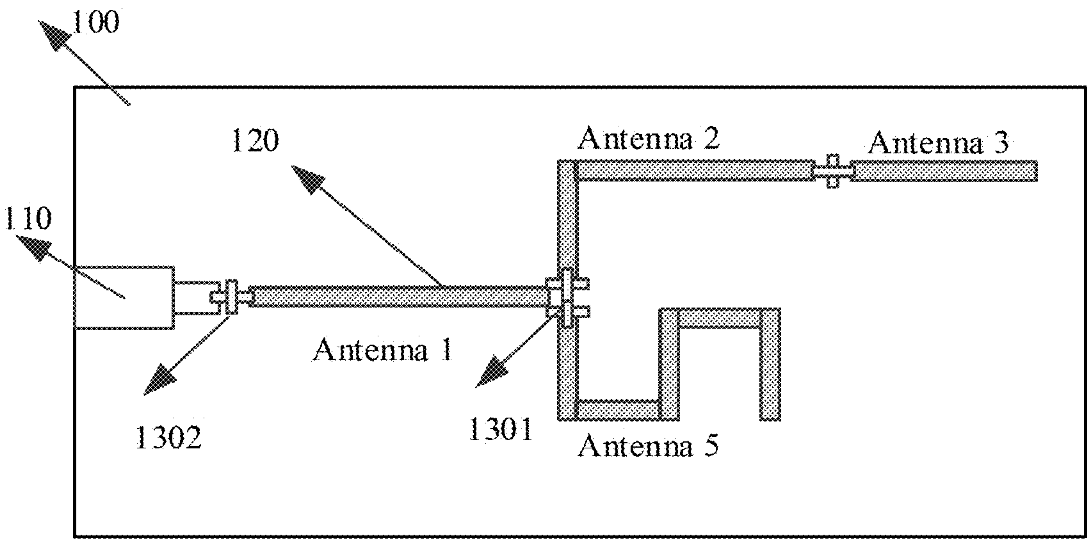
FIG. 3 is a schematic view illustratively showing a layout of a tunable antenna provided by an embodiment of the present disclosure.

In another optional example, referring to that shown in FIG. 3, it is a schematic view showing a layout of a tunable antenna. As shown in FIG. 3, in a condition of including a first MEMS switch 1301 and a second MEMS switch 1302, the first MEMS switch 1301 may be set among three adjacent antennas, and the second MEMS switch 1302 may be set between the microstrip feeder and one of the plurality of antennas, the second MMES switch 1302 may be set between two adjacent antennas as well, wherein:

- the fixed ends of the two cantilever beams of the first MEMS switch are connected with an output end of the same antenna, and the movable ends of the two cantilever beams are suspended above the different antennas; and
- the fixed end of the cantilever beam of the second MEMS switch is connected with the microstrip feeder, and the movable end of the cantilever beam is suspended above one of the plurality of antennas.

Among them, that the movable end is suspended above the antenna may be understood as that: there is a certain distance between the movable end and the antenna, and when the movable end is driven by a voltage of the driving electrode, the movable end will contact the antenna.

The MEMS switch of the one cantilever beam is set between the microstrip feeder and one of the plurality of antennas, to control whether the antenna receives and transmits the electromagnetic wave. In a condition that the antenna needs to receive the electromagnetic wave, the antenna and the microstrip feeder are conducted to each other. As shown in FIG. 3, when the antenna needs to receive and transmit the electromagnetic wave, the microstrip feeder and the antenna 1 are conducted to each other, and when the antenna does not need to receive and transmit the electromagnetic wave, the microstrip feeder and the antenna 1 are not conducted, which may be applied to a scene requiring signal shielding.

The MEMS switch of the two cantilever beams is set among three adjacent antennas in the plurality of antennas, to control a length of a transmission path of the electromagnetic wave, so as to realize the frequency reconfiguration. As shown in FIG. 3, the first MEMS switch is set among the antenna 1, the antenna 2 and the antenna 5, wherein the fixed ends of the two cantilever beams of the first MEMS switch are all connected with the antenna 1, the movable end of one of the two cantilever beams is suspended above the antenna 2, and the movable end of the other one cantilever beam is suspended above the antenna 5. In a condition that the second MEMS switch conducts the microstrip feeder and the corresponding antenna 1, if the first MEMS switch is not conducted, a frequency band of the electromagnetic wave is an operating frequency band of the antenna 1, and if the first MEMS switch conducts the antenna 1 and the antenna 4, a frequency band of the electromagnetic wave is an operating frequency band of an antenna composed of the antenna 1 and the antenna 2, and if the first MEMS switch conducts the antenna 1 and the antenna 5, a frequency band of the electromagnetic wave is an operating frequency band of an antenna composed of the antenna 1 and the antenna 5. If the second MEMS switch conducts the microstrip feeder and the corresponding antenna 1, and another second MEMS switch between the antenna 2 and the antenna 3 is conducted, a frequency band of the electromagnetic wave is an operating frequency band of an antenna composed of the antenna 1, the antenna 2 and the antenna 3.

In another optional example, the first MEMS switch is set between the microstrip feeder and two antennas in the plurality of antennas, and the second MEMS switch is set between two adjacent antennas: wherein:

- the fixed ends of the two cantilever beams of the first MEMS switch are connected with the output end of the microstrip feeder, and the movable ends of the two cantilever beams are suspended above the different antennas; and
- the fixed end of the cantilever beam of the second MEMS switch is connected with one of the two adjacent antennas, and the movable end of the cantilever beam is suspended above the other antenna.

In the embodiment, the first MEMS switch may be connected among three adjacent antennas as well, and a specific connection manner is shown in FIG. 3. Among them, the first MEMS switch is a switch of an upper cantilever, fixed points of the two cantilever beams are all connected to the microstrip feeder, the movable end of one cantilever beam is suspended above one antenna of the two adjacent antennas, and the movable end of the other cantilever beam is suspended above the other antenna of the two adjacent antennas. The second MEMS switch is the switch of the one cantilever beam, the fixed end of the one cantilever beam of the second MEMS switch is connected to one antenna of the two adjacent antennas, and the movable end is to be suspended on the other antenna of the two adjacent antennas. Among them, a plurality of the second MEMS switches may be set according to the number of the antennas.

Figure 4:
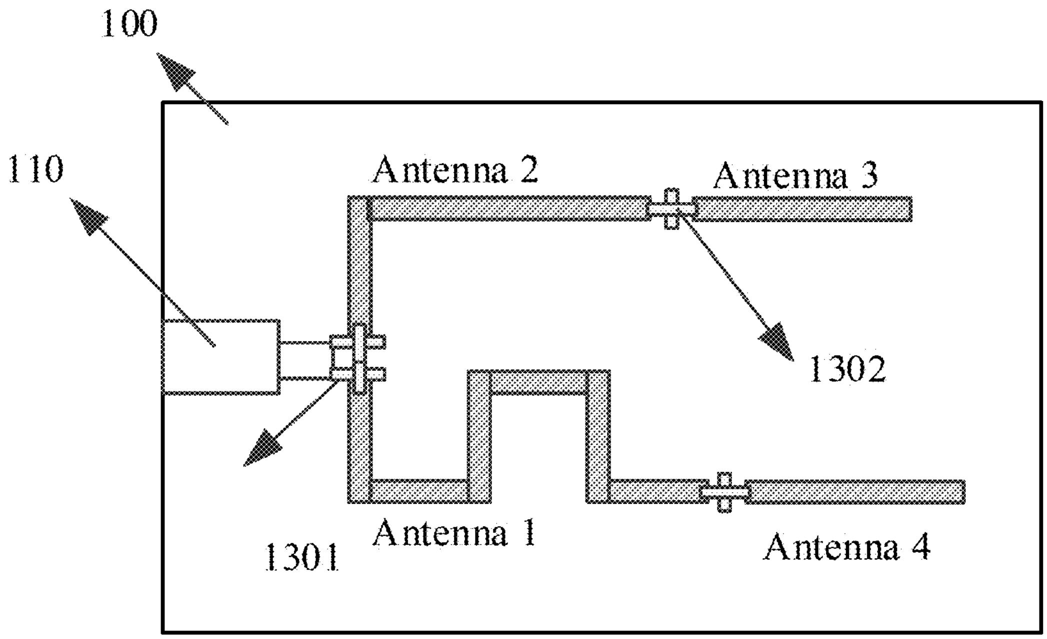
FIG. 4 is a schematic view illustratively showing a layout of another tunable antenna provided by an embodiment of the present disclosure.

Referring to that shown in FIG. 4, it is a schematic view showing a layout of a tunable antenna in an embodiment. As shown in FIG. 4, the first MEMS switch 1301 is connected between the microstrip feeder and the antenna 1 and the antenna 2, the second MEMS switch 1302 is connected between the antenna 2 and the antenna 3, and another second MEMS switch 1302 is connected between the antenna 1 and the antenna 4. In this way, a formed transmission path includes: the microstrip feeder-the antenna 1, the microstrip feeder-the antenna 2, the microstrip feeder-the antenna 2-the antenna 3, and the microstrip feeder-the antenna 1-the antenna 4. Different transmission paths are used for outputting the electromagnetic waves of different frequency bands.

Next, in an optional embodiment, a specific structure of a tunable antenna is provided. The tunable antenna may include three antennas and two control switches, may have three transmission paths, and may output a high-frequency signal with a wide frequency band.

Figure 5:
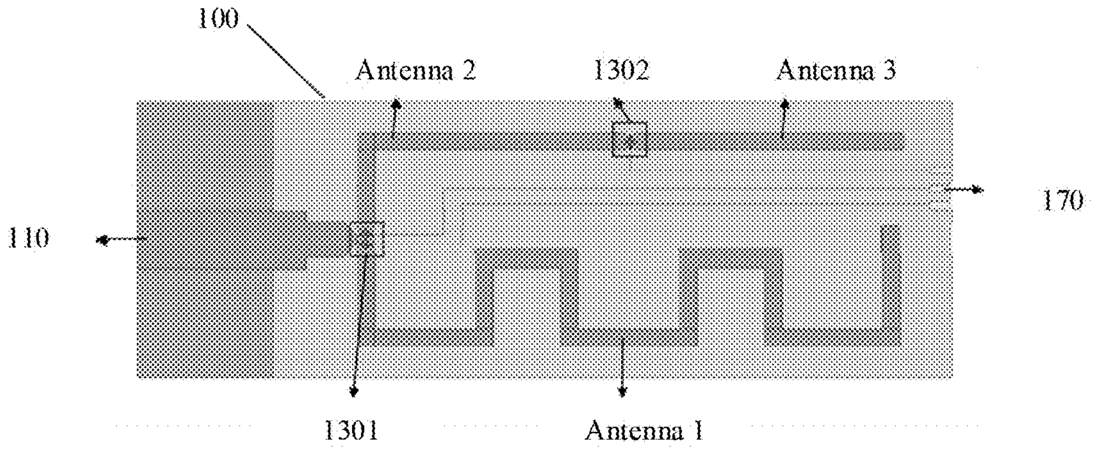
FIG. 5 is a schematic view illustratively showing a layout of still another tunable antenna provided by an embodiment of the present disclosure.

Specifically, the tunable antenna in the embodiment includes three antennas, namely, respectively a first antenna, a second antenna and a third antenna. Referring to that shown in FIG. 5, it is a schematic view showing a practice structure of a tunable antenna. As shown in FIG. 5, the first antenna corresponds to the antenna 1 in FIG. 5, the second antenna corresponds to the antenna 2 in FIG. 5, and the third antenna corresponds to the antenna 3 in FIG. 5. The movable ends of the two cantilever beams of the first MEMS switch 1301 are respectively suspended above one end of the first antenna and one end of the second antenna; and the fixed end of the cantilever beam of the second MEMS switch 1302 is connected with the other end of the second antenna, and the movable end of the cantilever beam is suspended above one end of the third antenna.

Among them, when the first MEMS switch conducts the microstrip feeder and the first antenna, the microstrip feeder provides the coupling signal to the first antenna, to output the electromagnetic wave of a first frequency band.

Among them, when the first MEMS switch conducts the microstrip feeder and the second antenna, the microstrip feeder provides the coupling signal to the second antenna, to output the electromagnetic wave of a second frequency band.

Among them, when the first MEMS switch conducts the microstrip feeder and the second antenna, and the second MEMS switch conducts the second antenna and the third antenna, the microstrip feeder provides the coupling signal to the second antenna and the third antenna, to output the electromagnetic wave of a third frequency band or a fourth frequency band.

In the embodiment, the first frequency band, the second frequency band, the third frequency band and the fourth frequency band may belong to a frequency band of 5G, which may be different from each other, and bandwidths thereof may be different from each other as well. Among them, when conducting the second antenna and the third antenna, the electromagnetic wave of the third frequency band or the fourth frequency band may be output, therefore the reconfiguration from the third frequency band to the fourth frequency band may be realized by increasing a width of the cantilever beam of the second MEMS switch. The details of specific implementation will be described later.

In practical application, lengths of the three antennas may be designed according to requirements of the first frequency band, the second frequency band, the third frequency band and the fourth frequency band. Specifically, a length of the first antenna may be designed according to the first frequency band, and a length of the second antenna may be designed according to the second frequency band. A length of antenna of the third frequency band may be obtained according to the third frequency band, and then a length of the third antenna may be obtained according to the length of the antenna of the third frequency band and the length of the second antenna.

Among them, the length of antenna may be obtained according to a formula: $L=C/(2f)$; wherein L is the length of the antenna, f is the operating frequency, and C is the speed of light. The length of the antenna calculated according to the formula may be slightly adjusted for adapting practical application.

In a specific application, as shown in FIG. 5, the antenna may work in a 5G band and may be reconfigurable in different frequency ranges in different 5G bands. In an optional embodiment, the first band is 2.496 GHZ-2.690 GHZ, the second band is 4.4 GHZ-5 GHZ, the third band is 3.3 GHZ-3.8 GHZ, and the fourth band is 3.3 GHZ-4.2 GHZ.

Among them. As shown in the above embodiments, the microstrip feeder provides the coupling signal to the second antenna and the third antenna, to output the electromagnetic wave of the third frequency band or the fourth frequency band, wherein the electromagnetic wave of the third frequency band may be an operating frequency band of the second antenna and the third antenna on the basis of not widening the movable end of the cantilever beam, while the fourth frequency band is the operating frequency band of the second antenna and the third antenna on the basis of widening the movable end of the cantilever beam.

Among them, a bandwidth of the fourth frequency band is larger than that of the third frequency band, which may be realized by increasing a width of the movable end of the second MEMS switch. Specifically, by widening the width of the movable end of the cantilever beam, a contact area between the movable end and the antenna may be increased, so that the antenna may receive more coupling signal, thus broadening the frequency band thereof.

Figure 6:
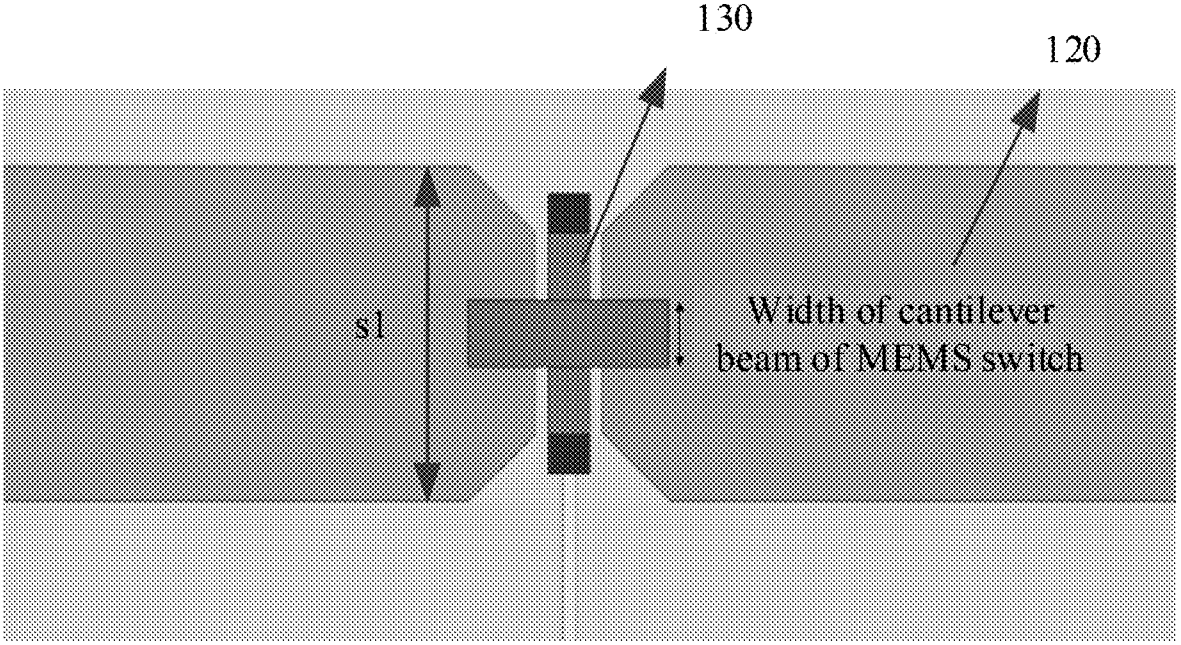
FIG. 6 is a schematic view illustratively showing by enlarging a connection relationship between a movable end of a cantilever beam of a MEMS switch and an antenna in the present disclosure.

In view of the above, referring to that shown in FIG. 6, it is a schematic view showing by enlarging a connection relationship between the movable end of the cantilever beam of the MEMS switch and the antenna. As shown in FIG. 6, a size of the movable end of the cantilever beam of the MEMS switch in a predetermined direction is larger than a first target size and smaller than a second target size, and the predetermined direction is a direction perpendicular to a length direction of the antenna (that is, a width direction of the above movable end).

Among them, the first target size is greater than or equal to 50 μm, and the second target size is less than or equal to a size of a width of the antenna. As shown in FIG. 6, the width of the antenna is s1, and the predetermined direction is a width direction of the cantilever beam of the MEMS switch, labeled in FIG. 6. As may be seen from FIG. 6, the wider the width direction of the cantilever beam is, the more a contact area between the control switch and the antenna is, so that more coupling signal may be introduced, to increase a width of the frequency band.

In the embodiment, for the control switch between adjacent antennas in the tunable antenna, the width of the movable end of the cantilever beam thereof may be arranged between the first target size and the second target size, that is, in a condition that two or more antennas are connected in series to form a transmission path, more coupling signal may be transmitted in the transmission path by appropriately increasing the width of the movable end, thus, a frequency band of the electromagnetic wave output by the original antennas connected in series may be widened.

Among them, the first target size may be greater than 50 μm, to maintain good contact between antennas. The second target size may be less than or equal to the width of the antenna. Specifically, the width of both ends of the antenna is generally less than the width of the middle section of the antenna. Therefore, the second target size may be the width of both ends of the antenna. It should be noted that, in a condition that a length of the antenna is determined, in order to ensure reliability of an operating frequency band of the antenna, the width of the antenna may be determined as well. Therefore, the second target size is determined as well in practice.

Specifically, the size of the movable end of the cantilever beam of the MEMS switch in the predetermined direction is 50 μm to 150 μm.

Figure 7:
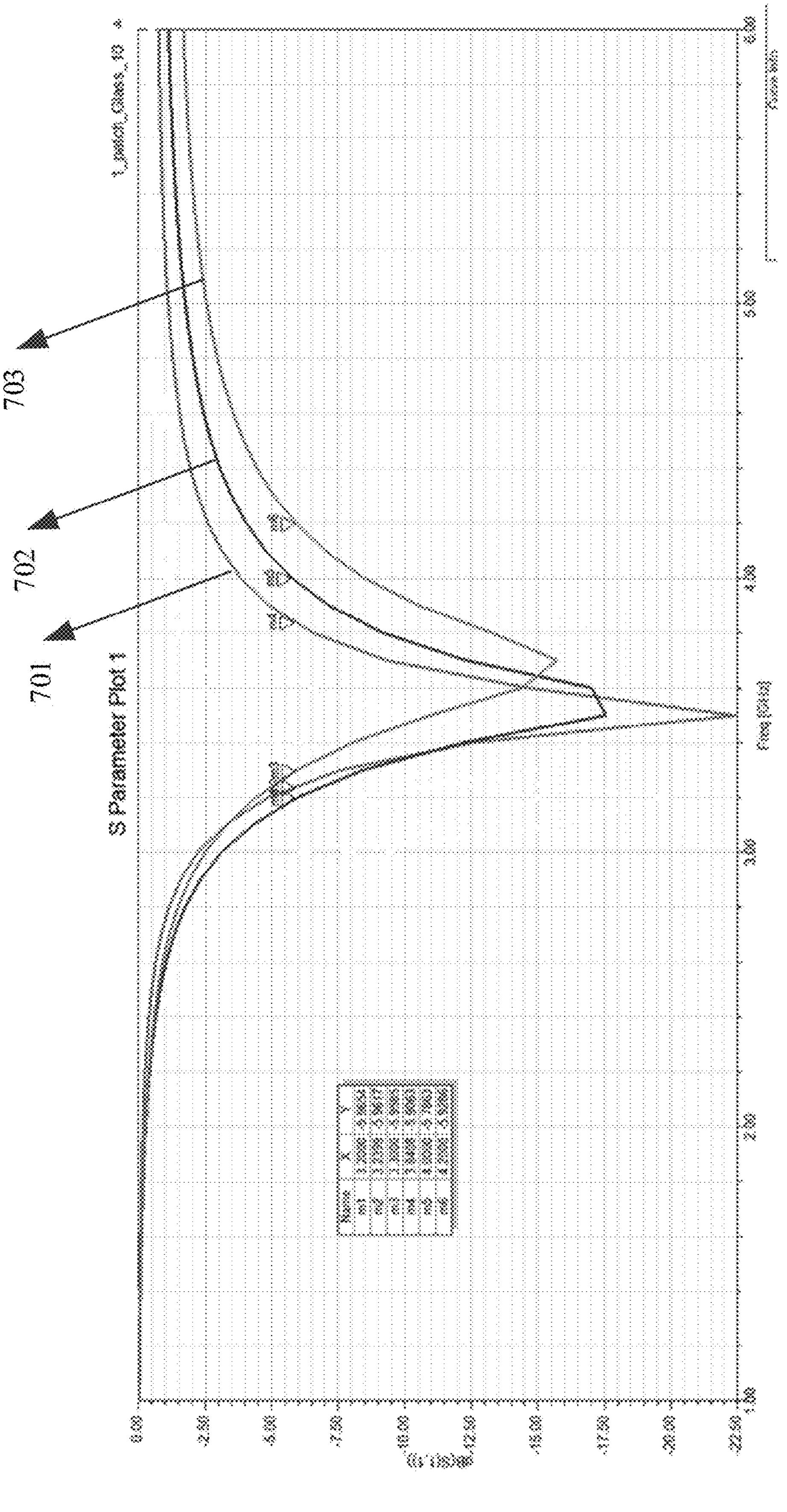
FIG. 7 is a schematic view illustratively showing frequency simulation results of the tunable antenna, in a condition that a width of the movable end of the cantilever beam of the MEMS switch provided by an embodiment of the present disclosure, respectively is 50 μm, 100 μm and 150 μm.

Referring to that shown in FIG. 7, it is a schematic view showing frequency simulation results of the tunable antenna, when the second antenna and the third antenna are conducted in a condition that the width of the movable end of the cantilever beam of the MEMS switch respectively is 50 μm, 100 μm and 150 μm.

As shown in FIG. 7, 701 corresponds to the simulation result when the width is 50 μm, 702 corresponds to the simulation result when the width is 100 μm, and 703 corresponds to the simulation result when the width is 150 μm. It may be seen that, with widening of the width of the movable end, frequency bands thereof may be further widened.

Next, a supplementary description will be given to the respective devices included in the tunable antenna of the present application.

In an optional embodiment, the antenna may be a monopole antenna. Among them, the monopole antenna is a vertical antenna having a length of a quarter wavelength, which may provide satisfactory radiation performance in a wide impedance bandwidth, is simple to be manufactured, and has low cost. Such type of antenna may cover an UWB band of 1.9 GHZ-10.6 GHZ.

In an optional embodiment, because the operating frequency band of the antenna is related to the length of the antenna, and the shorter the length of the antenna, the higher the frequency, the tunable antenna in the application may have antennas of different lengths, that is, antennas with different frequencies. Among them, for the antenna with the lowest operating frequency band, in order to save a layout space of the antenna, the antenna with the lowest operating frequency band may be arranged in a bending shape on the substrate, or arranged in a convoluted shape.

Figure 8:
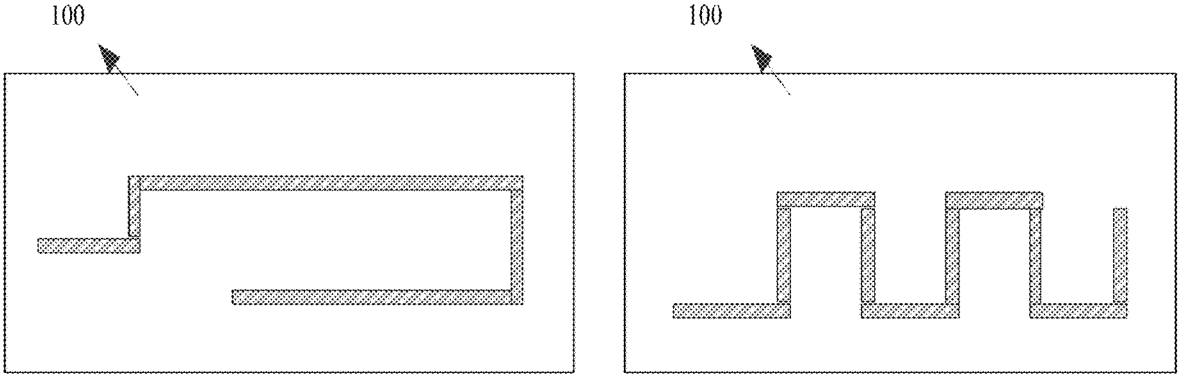
FIG. 8 is a schematic view illustratively showing a layout of an antenna with a lowest frequency band on a substrate, provided by an embodiment of the present disclosure.

Referring to that shown in FIG. 8, it is a schematic view showing a layout of the antenna with the lowest frequency band on a substrate. As shown in a left figure in FIG. 8, the antenna is arranged in the bending shape, and a right figure shows that the antenna is arranged in the convoluted shape. Among them, in arrangements of the bending shape or the convoluted shape, a certain amount of interval space should be provided to avoid electromagnetic interference.

Figure 9:
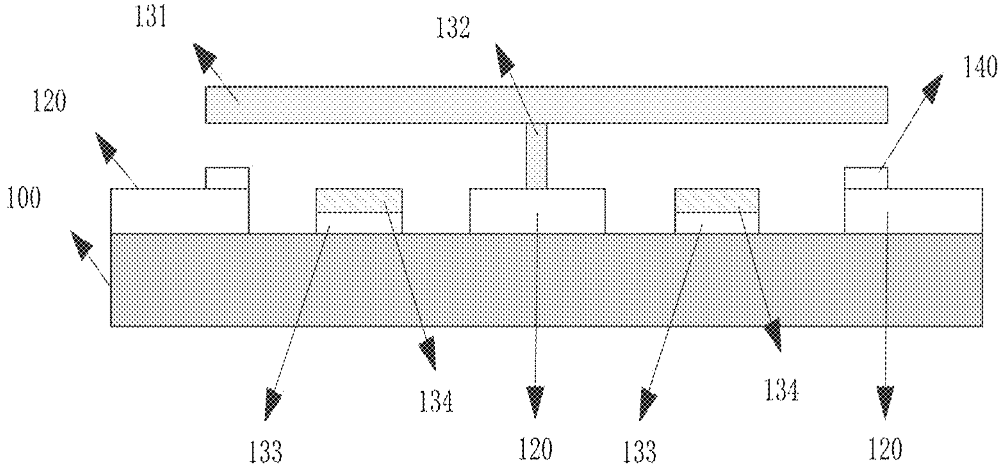
FIG. 9 is a schematic view illustratively showing a cross section of a tunable antenna provided by an embodiment of the present disclosure.

As shown in FIG. 9, it is a schematic view showing a cross section of a tunable antenna, in which the MEMS switch of the two cantilever beams is taken as an example, and in combination with that shown in FIG. 9, the tunable antenna of the application is described in detail.

In one embodiment, as shown in FIG. 9, an orthographic projection of the movable end 131 of the cantilever beam on the substrate 100 covers an orthographic projection of the driving electrode 133 on the substrate 100, and the orthographic projection of the driving electrode 133 on the substrate 100 does not overlap an orthographic projection of the antenna 120 on the substrate 100. In one example, an insulating layer 134 is provided on a side of the driving electrode 133 away from the substrate.

Generally speaking, the movable end of the cantilever beam of the control switch needs to contact with the antenna. In an optional example, as shown in FIG. 9, a convex contact point 140 may be set on an end of the antenna corresponding to the movable end, so that the movable end 131 may contact with the contact point 140, thus conducting the antenna. The convex contact point 140 may reduce a moving distance when the movable end contacts the antenna, so that the movable end may contact the antenna quickly and well, so as to shorten a response time and ensure contact performance.

As shown in FIG. 9, one of implementation manners is shown. The convex contact point 140 is set on the side of the antenna away from the substrate. An orthographic projection of the contact point 140 on the substrate overlaps with the orthographic projection of the movable end on the substrate.

Figure 10:
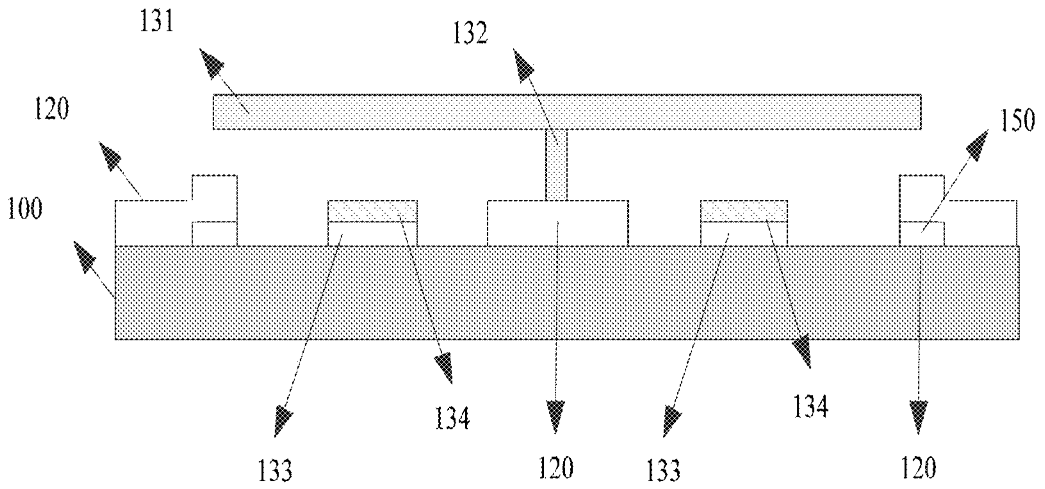
FIG. 10 is a schematic view illustratively showing a cross section of another tunable antenna provided by an embodiment of the present disclosure.

In another implementation, as shown in FIG. 10, FIG. 10 shows an antenna structure. Except that a structure of the contact point of the antenna is different from that of the antenna shown in FIG. 9, the rest is the same as that shown in FIG. 9. An insulating boss 150 is arranged on a side of the substrate, the antenna covers the insulating boss 150, and an orthographic projection of the insulating boss 150 on the substrate 100 is an overlapping area of the orthographic projection of the movable end 130 of the cantilever beam on the substrate 100 and the orthographic projection of the antenna 120 on the substrate 100.

In the embodiment, as shown in FIG. 10, the orthographic projection of the movable end of the cantilever beam on the substrate, the orthographic projection of the insulating boss on the substrate, and an orthographic projection of an end part of the antenna on the substrate have overlap, so that the orthographic projection of the movable end of the cantilever beam on the substrate overlaps with the orthographic projection of the antenna on the substrate.

When the above implementation manner is adopted, the movable end is configured to contact with or separate from the contact point under an action of a driving voltage, to be conducted or not conducted with the antenna.

Taking the tunable antenna shown in FIG. 5 as an example, the tunable antenna of the application is illustrated as follows.

The tunable antenna shown in FIG. 5 may cover a 5G sub-6 frequency band. The tunable antenna includes a microstrip feeder and three monopole antennas, namely, respectively the antenna 1 (corresponding to the first antenna), the antenna 2 (corresponding to the second antenna) and the antenna 3 (corresponding to the third antenna). It further includes two MEMS switches, namely, respectively a switch 1 (corresponding to the first MEMS switch) and a switch 2 (corresponding to the second MEMS switch), wherein the microstrip feeder is set at a side of the substrate and is located at one edge of the side of the substrate, to provide the coupling signal.

Among them, the switch 1 has a structure of the two cantilever beams. A central anchor point (fixed end) of the cantilever beam is directly connected to the microstrip feeder, and two ends (the movable ends) are set above the antenna 1 and the antenna 2. The convex contact points are set at a side of the antenna 1 and the antenna 2 away from the substrate, and in the overlapping area of the orthographic projection of the movable end on the substrate and the orthographic projection of the antenna on the substrate. The driving electrode is arranged below the cantilever beam, and the insulating layer is arranged on the side of the driving electrode away from the substrate.

The switch 2 has a structure of the one cantilever beam. The fixed end of the cantilever beam is directly connected to the antenna 3, and the movable end is suspended above the antenna 2. Similarly. The convex contact points are set at a side of the antenna 3 away from the substrate, and in the overlapping area of the orthographic projection of the movable end on the substrate and the orthographic projection of the antenna 3 on the substrate. The driving electrode is arranged below the cantilever beam, and the insulating layer is arranged on the side of the driving electrode away from the substrate.

As shown in FIG. 5, antenna 1 is arranged on a side of the substrate in the bending shape to save space. Among them, a state of the MEMS switch may be controlled by controlling the bias voltage applied between the cantilever beam and the driving electrode, and an antenna frequency reconfiguration may be realized by changing the state of the MEMS switch. Specifically, when the switch 1 conducts the microstrip feeder and the antenna 1, and the antenna 1 is in a radiation state, which may cover a frequency band of 2.496 GHZ-2.690 GHZ. When the switch 1 conducts the microstrip feeder and the antenna 2, the antenna 2 is in the radiation state, which and may cover a frequency band of 4.4 GHZ-5 GHZ. When the switch 1 conducts the microstrip feeder and the antenna 2 and the switch 2 conducts the antenna 2 and the antenna 3, the antenna 2 and the antenna 3 are connected in series, and the coupling signal provided by the microstrip feeder is transmitted in a serial of the antenna 2 and the antenna 3, which may cover a frequency band of 3.3 GHZ-3.8 GHZ.

Among them, when the width of the movable end of the cantilever beam switch is increased to 150 μm, and the coupling signal provided by the microstrip feeder is transmitted in the antenna 2 and the antenna 3, it may cover a frequency band of 3.3 GHZ-4.2 GHZ.

When the tunable antenna in the embodiment of the present application is adopted, it may transmit an electrical signal to a corresponding transmission line 170 through the control circuit. Different cantilever beams are equipped with different transmission lines. The transmission lines connected to the drive electrodes of the three cantilever beams may be wired in a length direction of the substrate, and then connected to the control circuit after converging at an edge of the substrate, so as to input the bias voltage to the corresponding drive electrode. Under the action of the bias voltage, The MEMS switch contact and conduct with the corresponding antenna, to change a frequency of antenna output.

Because the MEMS switch has advantages of fast response, small size and low power consumption, the tunable antenna of the application may be arranged on a smaller substrate, so as to realize miniaturization of the antenna, and at the same time, because of the fast response and low power consumption, a response speed of frequency reconfiguration may be improved.

Figure 11:
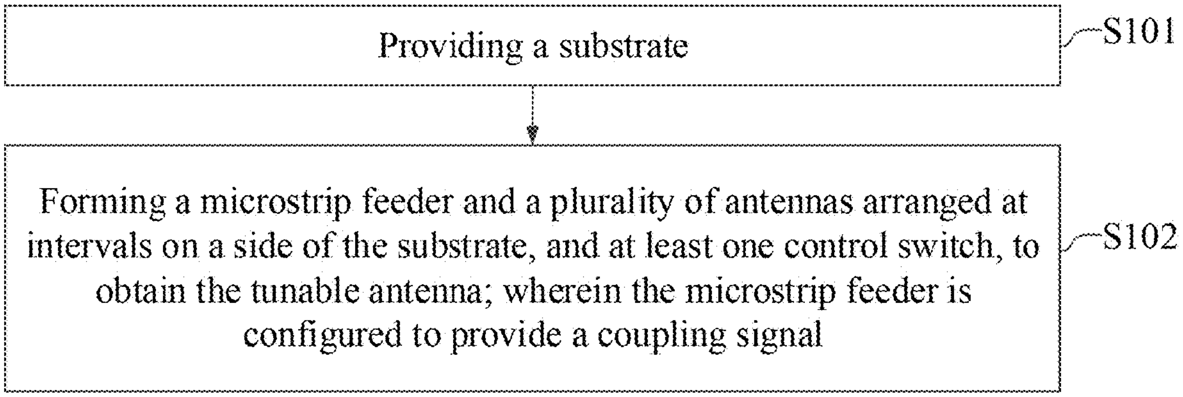
FIG. 11 is a flow chart illustratively showing steps of a method for preparing a tunable antenna provided by an embodiment of the present disclosure.

Based on the same inventive concept, a method for preparing a tunable antenna is provided. Referring to that shown in FIG. 11, it is a flow chart showing steps of the method for preparing the tunable antenna, As shown in FIG. 11, the method may include the following steps.

Step S101: providing a substrate.

Step S102: forming a microstrip feeder and a plurality of antennas arranged at intervals on a side of the substrate, and at least one control switch, to obtain the tunable antenna: wherein the microstrip feeder is configured to provide a coupling signal.

Among them, the at least one control switch is arranged between the microstrip feeder and the plurality of antennas, and/or between two adjacent antennas. The control switch is configured to control conduction between the microstrip feeder and one or more of the plurality of antennas, so as to output the coupling signal provided by the microstrip feeder into electromagnetic waves of different frequency bands.

Figure 12:
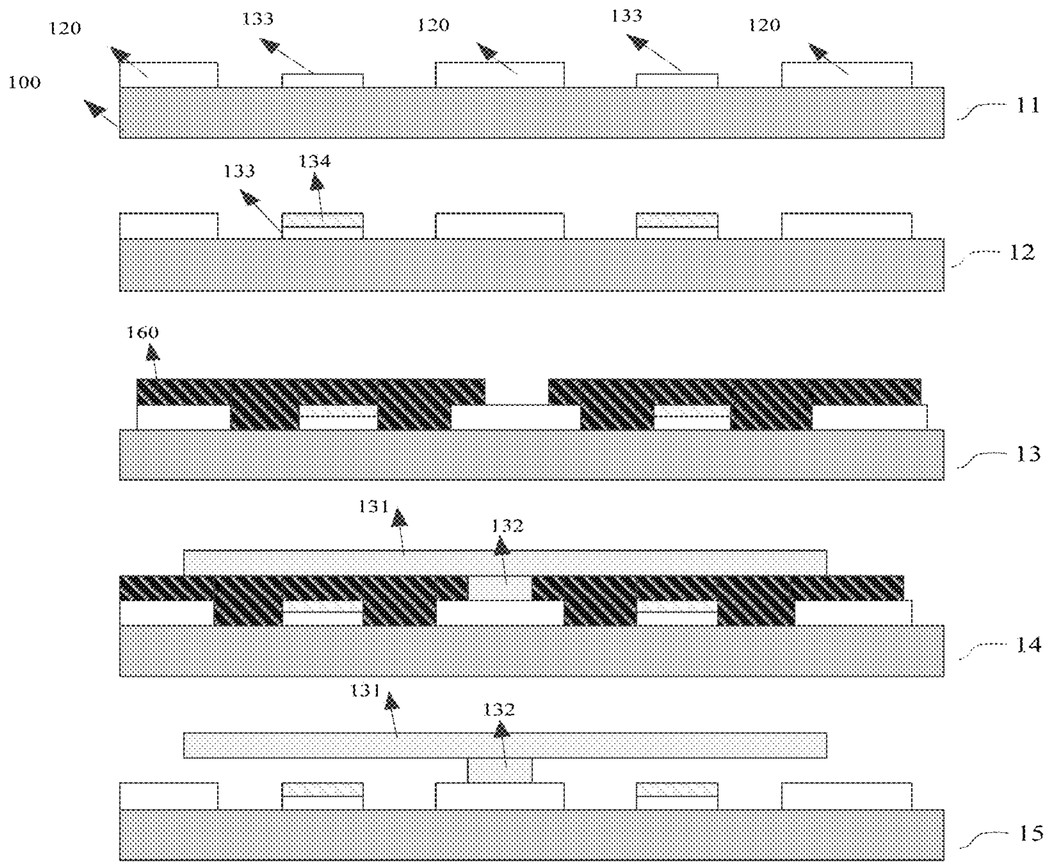
FIG. 12 is a schematic view illustratively showing a process flow for preparing a tunable antenna provided by an embodiment of the present disclosure.

In the embodiment, the control switch may be a MEMS switch. Referring to that shown in FIG. 12, it is a schematic view showing a process flow for preparing a tunable antenna. As shown in FIG. 12, taking the plurality of antennas including a first antenna and a second antenna as an example, and the control switch includes cantilever beams and driving electrodes corresponding to the cantilever beams, specifically, the following process flow is included:

Process 11: adopting a composition process, to form the microstrip feeder, the plurality of antennas and the driving electrodes on the side of the substrate.

Process 12: forming an insulating layer on a side of the driving electrodes away from the substrate, wherein an orthographic projection of the insulating layer on the substrate covers an orthographic projection of the driving electrode on the substrate, and the orthographic projection of the insulating layer on the substrate does not overlap with an orthographic projection of the antenna on the substrate.

Process 13: patterning on a side of the insulating layer away from the substrate to form a sacrificial layer, wherein an orthographic projection of the sacrificial layer on the substrate covers at least an orthographic projection of the first antenna on the substrate, and the orthographic projection of the sacrificial layer on the substrate does not overlap with an orthographic projection of the second antenna on the substrate.

Process 14: forming the cantilever beam on a side of the sacrificial layer away from the substrate, wherein one end of the cantilever beam contacts with the second antenna, and an orthographic projection of the other end of the cantilever beam on the substrate overlaps with the orthographic projections of the first antenna and the driving electrode on the substrate respectively.

Process 15: releasing the sacrificial layer, to make the said the other end of the cantilever beam suspended above the first antenna as the movable end of the cantilever beam.

Among them, as shown in FIG. 12, it is a schematic view illustrating a process for manufacturing the MEMS switch of the two cantilever beams. The first antenna may be the left-most antenna 120, the second antenna may be the middle antenna 120, and the right-most antenna 120 is used to exemplarily illustrate the process for manufacturing the MEMS switch of the two cantilever beams connected among three adjacent antennas.

Among them, in an optional example, the antenna needs to be set with the convex contact point, to make the movable end of the cantilever beam contact the contact point when the movable end of the cantilever beam is subject to the bias voltage provided by the driving electrode, so as to conduct the antenna and the microstrip feeder, or conduct two antennas. Therefore, one preparation method is: after forming the microstrip feeder, the plurality of antennas and the driving electrodes on a side of the substrate, to form the insulating layer on the side of the driving electrodes away from the substrate, and at the same time, to deposit the metal layer at the end of the antenna to form the contact points. Specifically, in the process 12, metal convex points may be further formed on the side of the antennas away from the substrate. Then, in the process 14, when the cantilever beam is formed at a side of the sacrificial layer away from the substrate, an orthographic projection of the metal convex point on the substrate may be made be an overlapping area of the orthographic projection of the cantilever beam on the substrate and the orthographic projection of the antenna on the substrate.

In another manner for preparing the contact point, before forming the microstrip feeder, the plurality of antennas and the driving electrodes on a side of the substrate, patterns of the microstrip feeder, the plurality of antennas and the driving electrodes may be composited on the side of the substrate previously: then insulating bosses are formed on the side of the substrate in areas corresponding to the ends of the respective antennas. Accordingly, when forming the microstrip feeder, the plurality of antennas and the driving electrodes, the composition process may be adopted to form the microstrip feeder, the plurality of antennas and the driving electrode on the side of the substrate where the insulating bosses have been formed, wherein the antennas cover the insulating bosses, and an orthographic projection of the insulating boss on the substrate is: an overlapping area of the orthographic projection of the movable end of the cantilever beam on the substrate and the orthographic projection of the antenna on the substrate.

Figure 13:
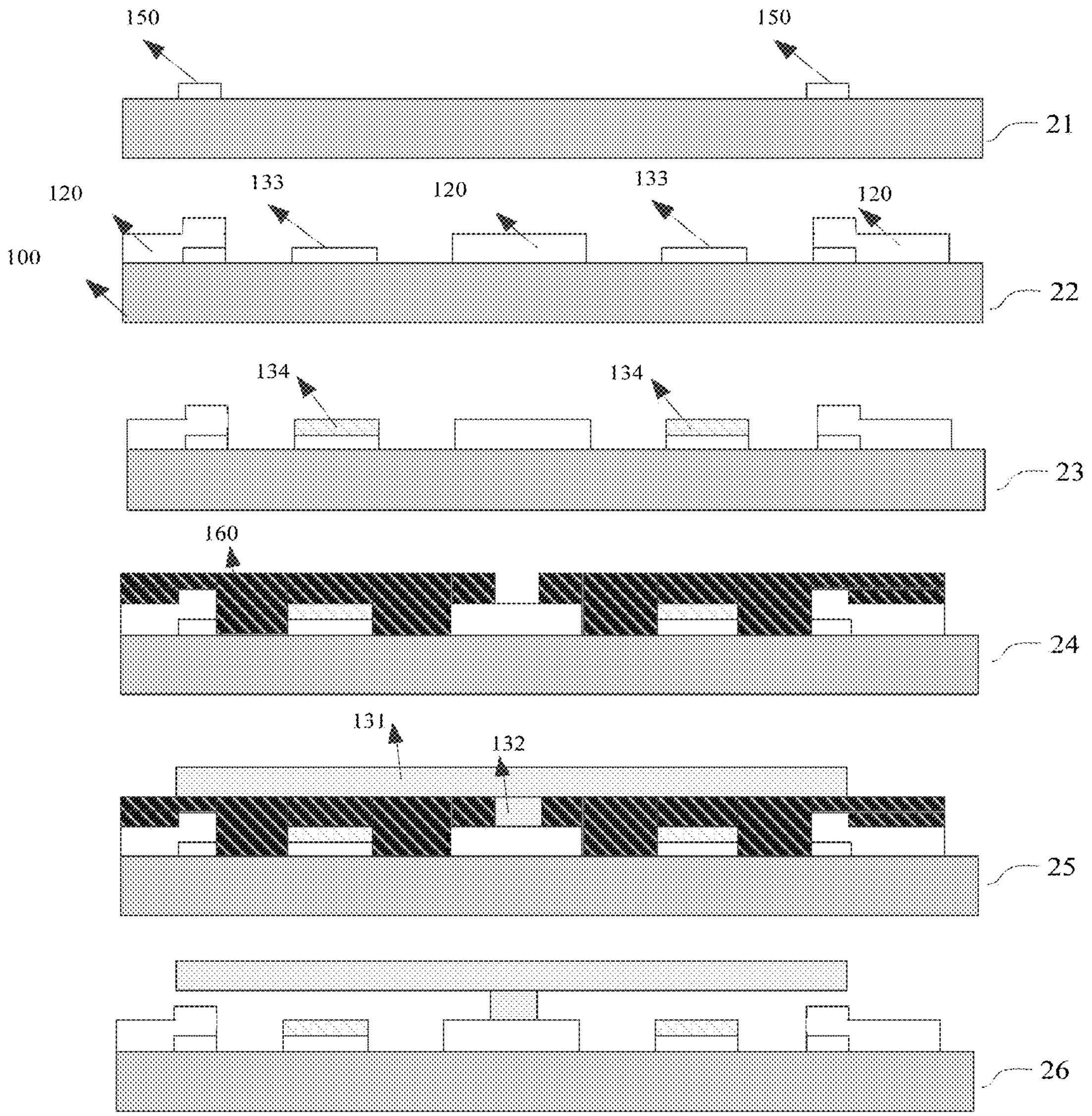
FIG. 13 is a schematic view illustratively showing anther process flow for preparing a tunable antenna provided by an embodiment of the present disclosure.

When a process of the insulating boss is adopted, the whole preparation process of the tunable antenna may be as shown in FIG. 13, specifically as follows:

Process 21: compositing patterns of a microstrip feeder, a plurality of antennas and driving electrodes at a side of the substrate; and forming insulating bosses on a side of the substrate in areas where the patterns of the respective antennas are located.

Process 22: adopting a composition process to form the microstrip feeder, the plurality of antennas and the driving electrode on the said a side of the substrate.

Process 23: forming an insulating layer on a side of the driving electrodes away from the substrate, wherein an orthographic projection of the insulating layer on the substrate covers the orthographic projection of the driving electrode on the substrate, and the orthographic projection of the insulating layer on the substrate does not overlap with the orthographic projection of the antenna on the substrate.

Process 24: patterning a side of the insulating layer away from the substrate to form a sacrificial layer, wherein an orthographic projection of the sacrificial layer on the substrate covers at least an orthographic projection of the first antenna on the substrate, and the orthographic projection of the sacrificial layer on the substrate does not overlap with an orthographic projection of the second antenna on the substrate.

Process 25: forming a cantilever beam on a side of the sacrificial layer away from the substrate, wherein one end of the cantilever beam contacts with the second antenna, and the other end of the orthographic projection on the substrate overlaps with the orthographic projection of the first antenna and the orthographic projection of the driving electrode on the substrate respectively.

Process 26: releasing the sacrificial layer, to make the said the other end of the cantilever beam suspended above the first antenna as the movable end of the cantilever beam.

By adopting the preparation method of the embodiment, the insulating boss may be set on the substrate first, thus the preparation process of the contact point of the MEMS switch is optimized, so that it is not necessary to deposit the metal contact point on the antenna after the antenna and the driving electrode are formed. A process of redepositing the metal contact point is more complex than that of preparing the insulating boss, and requires a small contact area, and highly requires a metal deposition process, therefore the process of insulating boss in the application may improve yield and stability of the MEMS switches.

Based on the same inventive concept, an embodiment of the present application further provides a display module, including a display panel and the tunable antenna in the above embodiments. When the display panel is adopted, the signals of different frequency bands may be received through the tunable antenna, so as to display information corresponding to the signals of different frequency bands.

Based on the same inventive concept, an embodiment of the present application further provides an electronic device, configured with the tunable antenna in the above embodiment.

Among them, on the one hand, the electronic device may receive and send signals of different frequency bands through the tunable antenna, to realize communication of different frequency bands. For example, when the electronic device is a mobile terminal, such as a mobile phone, the mobile phone may be operated in different frequency bands, so as to communicate under communication services provided by different operators. For example, when the tunable antenna may be reconfigured in a frequency band from the first frequency band to the fourth frequency band of the above embodiments, the mobile phone may be switched between the communication services provided by different operators.

Finally, it should be noted that, unless otherwise defined, the words "first". "second" and similar words used in the disclosure do not indicate any order, quantity or importance, but are only used to distinguish different components. Moreover, the terms "including". "containing" or any other variation thereof are intended to cover non-exclusive inclusion, so that a process, method, a commodity or a device that includes a series of elements, not only includes those elements, but also includes other elements that are not explicitly listed, or further includes elements inherent in such process, method, commodity or device. In absence of further restrictions, the elements defined by the statement "including a . . . " do not exclude existence of other identical elements in the process, method, commodity or device including the said elements. Similar terms such as "connection" or "connected" are not limited to physical or mechanical connections, but may include electrical connections, whether it is direct or indirect.

The above describes the tunable antenna of an antenna, the method for preparing the tunable antenna and the electronic device using the tunable antenna provided by the embodiments of the present disclosure in detail. In the disclosure, specific examples are used to explain principles and implementations of the present disclosure. The above examples are only used to help understand the method and core idea of the present disclosure. At the same time, for those ordinary skilled in the art, according to the idea of the present disclosure, there will be changes in the specific implementation and application scope. To sum up, the content of the specification should not be understood as a limitation of the present disclosure.

Those skilled in the art will easily think of other embodiments of the present disclosure after considering the description and practicing the disclosure disclosed herein. The present disclosure is intended to cover any variant, use or adaptive change of the present disclosure. These variants, uses or adaptive changes follow the general principles of the present disclosure and include the common knowledge or commonly used technical means in the technical field not disclosed in the present disclosure. The description and the embodiments are only regarded as illustrative. The true scope and spirit of the present disclosure are indicated by the accompanying claims.

It should be understood that the present disclosure is not limited to the precise structures described above and shown in the drawings, and various modifications and changes may be made without departing from the scope thereof. The scope of the present disclosure is limited only by the accompanying claims.

The "one embodiment". "an embodiment" or "one or more embodiments" mentioned in the specification means that the specific features, structures or characteristics described in combination with the embodiments are included in at least one embodiment of the present disclosure. In addition, please note that the word "in the embodiment" does not necessarily referring to the same embodiment.

A large number of specific details are described in the specification provided here. However, it may be understood that the embodiments of the present disclosure may be practiced without these specific details. In some examples, well-known methods, structures and techniques are not shown in detail so as not to obscure the understanding of the specification.

In the claims, any reference symbol between brackets shall not be constructed as a restriction on the claims. The word "comprising" does not exclude existence of elements or steps not listed in the claims. The word "one" or "a" before a component does not exclude existence of a plurality of such components. The present disclosure may be realized by means of hardware including several different elements and by means of a properly programmed computer. In the device claim that lists several devices, several of these devices may be embodied by the same hardware item. The use of words, the first, second, and third, etc., does not indicate any order. These words may be interpreted as names.

Finally, it should be noted that the above embodiments are only used to illustrate the technical solution of the application, not to limit it. Although the present application has been described in detail with reference to the above embodiments, those ordinary skilled in the art should understand that they may still modify the technical solutions recorded in the above embodiments or equally replace some of the technical features. However, these modifications or substitutions do not make the essence of the corresponding technical solutions separate from the spirit and scope of the technical solutions of the embodiments of the application.

The invention claimed is:

1. A tunable antenna, comprising:

a substrate, and a microstrip feeder and a plurality of antennas arranged at intervals on a side of the substrate, wherein the microstrip feeder is configured to provide a coupling signal; and a control switch, arranged between the microstrip feeder and the plurality of antennas, and/or between at least two adjacent antennas the plurality of antennas, wherein the control switch is configured to control conduction between the microstrip feeder and at least one of the plurality of antennas, so as to output the coupling signal provided by the microstrip feeder into electromagnetic waves of different frequency bands, the control switch comprises a microelectromechanical system (MEMS) switch, and the MEMS switch comprises at least a cantilever beam and a drive electrode arranged corresponding to the cantilever beam, wherein the drive electrode is configured to apply a driving voltage, the cantilever beam comprises a fixed end and a movable end, and the movable end is configured to contact with or separate from the antenna under an action of the driving voltage, and an insulating boss is arranged on a side of the substrate, the antenna covers the insulating boss, and an orthographic projection of the insulating boss on the substrate is an overlapping area of an orthographic projection of the movable end of the cantilever beam on the substrate and an orthographic projection of the antenna on the substrate.

2. The tunable antenna according to claim 1, wherein the control switch comprises at least one first MEMS switch and at least one second MEMS switch, wherein the first MEMS switch comprises two of the cantilever beams, and the second MEMS switch comprises one of the cantilever beam.

3. The tunable antenna according to claim 1, wherein a size of the movable end of the cantilever beam of the MEMS switch in a predetermined direction is larger than a first target size and smaller than a second target size, the predetermined direction is a direction perpendicular to a length direction of the antenna, the first target size is greater than or equal to 50 μm, and the second target size is less than or equal to a size of a width of the antenna.

4. The tunable antenna according to claim 3, wherein the size of the movable end of the cantilever beam of the MEMS switch in the predetermined direction is 50 μm to 150 μm.

5. The tunable antenna according to claim 1, wherein an orthographic projection of the movable end of the cantilever beam on the substrate covers an orthographic projection of the driving electrode on the substrate, and the orthographic projection of the driving electrode on the substrate does not overlap an orthographic projection of the antenna on the substrate.

6. An electronic device, using the tunable antenna according to claim 1.

7. The electronic device according to claim 6, wherein the control switch comprises at least one first MEMS switch and at least one second MEMS switch, wherein the first MEMS switch comprises two of the cantilever beams, and the second MEMS switch comprises one of the cantilever beam.

* * * * *